US010570268B2

(12) United States Patent
Yamamoto

(10) Patent No.: US 10,570,268 B2
(45) Date of Patent: Feb. 25, 2020

(54) MODIFIED ETHYLENE-VINYL ESTER SAPONIFIED COPOLYMER RESIN COMPOSITION

(71) Applicant: THE NIPPON SYNTHETIC CHEMICAL INDUSTRY CO., LTD., Osaka (JP)

(72) Inventor: Nobuyuki Yamamoto, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/574,358

(22) PCT Filed: May 19, 2015

(86) PCT No.: PCT/JP2015/064375
§ 371 (c)(1),
(2) Date: Nov. 15, 2017

(87) PCT Pub. No.: WO2016/185571
PCT Pub. Date: Nov. 24, 2016

(65) Prior Publication Data
US 2018/0134869 A1 May 17, 2018

(51) Int. Cl.
C08K 3/00 (2018.01)
C08K 5/098 (2006.01)
C08L 29/04 (2006.01)
C08L 67/04 (2006.01)
C08G 81/02 (2006.01)
C08F 8/14 (2006.01)
C08K 3/08 (2006.01)
C08K 3/105 (2018.01)

(52) U.S. Cl.
CPC ............ C08K 5/098 (2013.01); C08F 8/14 (2013.01); C08G 81/02 (2013.01); C08K 3/08 (2013.01); C08K 3/105 (2018.01); C08L 29/04 (2013.01); C08L 67/04 (2013.01); C08K 2003/0818 (2013.01)

(58) Field of Classification Search
CPC .. C08K 5/098; C08F 8/14; C08G 8/02; C08L 29/04; C08L 67/04
See application file for complete search history.

(56) References Cited

U.S. PATENT DOCUMENTS

| 5,118,743 A | 6/1992 | Yonezu et al. |
| 5,360,670 A | 11/1994 | Yonezu et al. |
| 5,904,974 A | 5/1999 | Hanada et al. |
| 5,922,808 A | 7/1999 | Hanada et al. |
| 6,232,382 B1 | 5/2001 | Ninomiya et al. |
| 6,686,405 B1 | 2/2004 | Kawahara et al. |
| 2004/0082690 A1 | 4/2004 | Kawahara et al. |
| 2009/0098363 A1 | 4/2009 | Herbiet et al. |
| 2010/0068435 A1 | 3/2010 | Uradnisheck |

FOREIGN PATENT DOCUMENTS

| EP | 0308703 A2 | 3/1989 |
| EP | 0787755 A | 8/1997 |
| JP | 64-66262 A | 3/1989 |
| JP | 7-118469 A | 5/1995 |
| JP | 8-188689 A | 7/1996 |
| JP | 9-67414 A | 3/1997 |
| JP | 9-208638 A | 8/1997 |
| JP | 11-106592 A | 4/1999 |
| JP | 2000-143736 A | 5/2000 |
| JP | 2001-098077 A | 4/2001 |
| JP | 2001-113646 A | 4/2001 |
| JP | 2006-282833 A | 10/2006 |
| JP | 2009-532314 A | 9/2009 |
| JP | 2012-502175 A | 1/2012 |
| JP | 2015-017213 A | 1/2015 |
| JP | 2015-101612 A | 6/2015 |

OTHER PUBLICATIONS

International Search Report with English Translation in respect to International Application No. PCT/JP2015/064375, dated Jul. 28, 2015.
International Written Opinion in respect to International Application No. PCT/JP2015/064375, dated Jul. 21, 2015.
Extended European Search Report issued in the corresponding European patent application No. 15892571.9 dated Jan. 8, 2019.
Database Entry XP-002786190, Accession No. 2015:531300 including annex containing a translation of Japanese Publication No. 2015-059131 published Mar. 30, 2015.
European Office Action dated Aug. 13, 2019 in corresponding European Application No. 15892571.9.

Primary Examiner — Edward J Cain
(74) Attorney, Agent, or Firm — Greenblum & Bernstein, P.L.C.

(57) ABSTRACT

The present invention provides a composition of a modified ethylene-vinyl ester saponified copolymer having an aliphatic polyester grafted thereto, the composition having excellent melt-extrusion moldability. The modified ethylene-vinyl ester saponified copolymer composition of the invention comprises a modified ethylene-vinyl ester saponified copolymer having an aliphatic polyester grafted thereto and at least one metal selected from the group consisting of alkali metal and alkaline earth metal.

3 Claims, No Drawings

MODIFIED ETHYLENE-VINYL ESTER SAPONIFIED COPOLYMER RESIN COMPOSITION

TECHNICAL FIELD

The present invention relates to a modified ethylene-vinyl ester saponified copolymer (hereinafter often referred to as "modified EVOH resin") resin composition comprising a modified EVOH resin having an aliphatic polyester grafted thereto and at least one metal selected from the group consisting of alkali metal and alkaline earth metal. More particularly, the present invention relates to a modified EVOH resin composition having excellent melt-extrusion moldability.

BACKGROUND ART

Ethylene-vinyl ester saponified copolymers (hereinafter often referred to as "EVOH resins") have exceedingly high intermolecular force due to hydrogen bonding between the hydroxyl groups present as side chains of the polymer. These copolymers hence have high crystallinity and have high intermolecular force even in the amorphous portions. Because of this, gas molecules and the like are less apt to pass through films employing EVOH resins, and the films employing EVOH resins show excellent gas barrier properties.

However, EVOH resins have a drawback in that the resins are hard and brittle and have poor flexibility. There have hence been problems, for example, in that in cases when EVOH resins are used as packaging materials or molding materials and bent repeatedly, the materials come to have cracks or pinholes due to flexing fatigue, etc. and be unable to retain the excellent performance.

As a means for overcoming the problem, a modified EVOH resin has been proposed, the modified EVOH resin being obtained by subjecting a lactone compound to a ring-opening polymerization reaction in the presence of an EVOH resin to thereby graft an aliphatic polyester to hydroxyl groups of the EVOH resin by ester bonds (see, for example, Patent Document 1).

PRIOR ART DOCUMENT

Patent Document

Patent Document 1: JP-A-9-208638

SUMMARY OF THE INVENTION

Problem that the Invention is to Solve

Molded objects of EVOH resins are usually obtained by melt molding such as extrusion molding. In the case of using unmodified EVOH resins, the fluctuations in resin viscosity (viscosity increase, viscosity decrease) during long-term continuous molding are in a permissible range and these resins have been able to be molded without posing any problem.

However, in the case where the modified EVOH resin of Patent Document 1 is subjected to melt extrusion molding, there has been a problem in that the resin increases considerably in viscosity with the lapse of time to decrease in moldability or impose load on the molding machine.

Accordingly, an object of the invention is to provide a modified EVOH resin composition which can be easily extrusion-molded even in melt extrusion molding.

Means for Solving the Problem

The present inventor diligently made investigations under these circumstances and, as a result, has discovered that a modified EVOH resin composition obtained by incorporating at least one metal selected from the group consisting of alkali metal and alkaline earth metal into a modified EVOH resin is inhibited from increasing in viscosity with the lapse of time and has excellent melt-extrusion moldability. The present invention has been thus completed.

The present invention has the following configurations [1] to [6].

[1] A modified ethylene-vinyl ester saponified copolymer resin composition comprising: a modified ethylene-vinyl ester saponified copolymer (A) having an aliphatic polyester grafted thereto; and at least one metal selected from the group consisting of alkali metal (B) and alkaline earth metal (C).

[2] The modified ethylene-vinyl ester saponified copolymer resin composition according to [1], wherein the metal comprises the alkali metal (B).

[3] The modified ethylene-vinyl ester saponified copolymer resin composition according to [1], wherein the metal comprises the alkali metal (B) and the alkaline earth metal (C).

[4] The modified ethylene-vinyl ester saponified copolymer resin composition according to any one of [1] to [3], wherein a content of the alkali metal (B) is 10-2,000 ppm by weight of the modified ethylene-vinyl ester saponified copolymer.

[5] The modified ethylene-vinyl ester saponified copolymer resin composition according to any one of [1] to [3], wherein a content of the alkaline earth metal (C) is 30-2,000 ppm by weight of the modified ethylene-vinyl ester saponified copolymer.

[6] The modified ethylene-vinyl ester saponified copolymer resin composition according to any one of [1] to [5], wherein the metal is contained as a salt.

Effect of the Invention

The modified EVOH resin composition of the invention has the effect of increasing little in viscosity with the lapse of time during melt extrusion molding to show excellent moldability.

MODES FOR CARRYING OUT THE INVENTION

The configurations of the invention are explained below in detail. However, the following explanations are on desirable embodiments, and the present invention should not be construed as being limited to the embodiments.

The modified EVOH resin composition of the invention comprises: a modified ethylene-vinyl ester saponified copolymer (A) having an aliphatic polyester grafted thereto (modified EVOH resin); and at least one metal selected from the group consisting of alkali metal (B) and alkaline earth metal (C).

<Explanation of Modified EVOH Resin (A)>

The modified EVOH resin (A) of the invention is an EVOH resin to which an aliphatic polyester has been grafted.

The modified EVOH resin (A) can be obtained, for example, by subjecting a lactone compound to a ring-opening polymerization reaction and a grafting reaction in the presence of an EVOH resin.

The formation of an aliphatic polyester through a grafting reaction proceeds from hydroxyl groups of the EVOH resin, as initiation ends.

The grafting reaction of a lactone compound in the presence of an EVOH resin is explained below in detail.
[EVOH Resin]

First, the EVOH resin to be used as a starting material for the modified EVOH resin (A) of the invention is explained.

The EVOH resin to be used in the invention is a resin usually obtained by copolymerizing ethylene and a vinyl ester monomer and then saponifying the copolymer, and is a water-insoluble thermoplastic resin. As the vinyl ester monomer, vinyl acetate is generally used from the standpoint of economic. Although any desired known polymerization method such as, for example, solution polymerization, suspension polymerization, or emulsion polymerization can be used, use is generally made of solution polymerization in which methanol is used as a solvent. Saponification of the ethylene-vinyl ester copolymer obtained can be performed also by a known method.

Namely, the EVOH resin mainly contains ethylene structural units and vinyl alcohol structural units and further contains a slight amount of vinyl ester structural units which remain unsaponified.

The content of ethylene structural units in the EVOH resin to be used in the invention is usually 20-60% by mole, preferably 25-50% by mole, especially preferably 29-45% by mole. In case where the content thereof is too low, the flexibility tends to decrease. Conversely, in case where the content thereof is too high, the gas barrier properties tend to decrease.

The content of ethylene structural units can be determined, for example, in accordance with ISO 14663-1 (1999).

The degree of saponification of the vinyl ester component in the EVOH resin is usually 80-100% by mole, preferably 90-99.99% by mole, especially preferably 99-99.99% by mole. In case where the degree of saponification thereof is too low, the flexibility tends to decrease.

The degree of saponification of the vinyl ester component can be determined, for example, in accordance with JIS K6726 (1994) (the EVOH resin is examined in the state of an even solution thereof in water/methanol solvent).

The melt flow rate (MFR) (210° C.; load, 2,160 g) of the EVOH resin is usually 1-50 g/10 min, preferably 1.5-25 g/10 min, especially preferably 2-20 g/10 min. In case where the MFR thereof is too high, the barrier properties tend to decrease. In case where the MFR thereof is too low, the flexibility tends to decrease.

The EVOH resin to be used may be a mixture of two or more EVOH resins differing in ethylene content, degree of saponification, or MFR, so long as the average values thereof satisfy the requirements shown above.

The EVOH resin to be used in the invention may further contain structural units derived from the comonomers shown below. The comonomers are α-olefins such as propylene, isobutene, α-octene, α-dodecene, and α-octadecene, hydroxyl-group-containing α-olefins such as 3-buten-1-ol, 4-penten-1-ol, and 3-butene-1,2-diol, derivatives of such hydroxyl-group-containing α-olefins, such as products of esterification or acylation thereof, unsaturated carboxylic acids or salts, partial alkyl esters, complete alkyl esters, nitriles, amides, and anhydrides of the acids, unsaturated sulfonic acids or salts thereof, vinylsilane compounds, vinyl chloride, and styrene.

Also usable are EVOH-based resins which have undergone an "after modification" such as urethane formation, acetalization, cyanoethylation, or oxyalkylenation.

Preferred of such modifications are EVOH resins in which primary hydroxyl groups have been introduced into side chains by copolymerization, from the standpoint that these resins have improved secondary moldability in stretching, vacuum/air-pressure forming, etc. Of these, an EVOH resin having 1,2-diol structures in side chains is preferred.
[Lactone Compound]

The lactone compound is not particularly limited so long as the lactone compound is one in which the ring which forms an aliphatic polyester upon ring-opening polymerization is configured of 3-10 carbon atoms. Such a lactone compound, when having no substituent, is represented by the following general formula, wherein n is an integer of 2-9. Preferably n is 4 or 5. The alkylene chain —$(CH_2)_n$— in the following formula may be one in which any of the carbon atoms thereof has at least one substituent such as a lower alkyl group having about 1-8 carbon atoms, a lower alkoxy group having about 1-8 carbon atoms, a cycloalkyl group, a phenyl group, an aralkyl group, or the like.

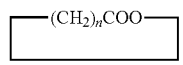

[Chem. 1]

Specific examples of the lactone compound include β-propiolactone compounds, γ-butyrolactone compounds, ε-caprolactone compounds, and δ-valerolactone compounds.

Examples of the β-propiolactone compounds include β-propiolactone and dimethylpropiolactone.

Examples of the γ-butyrolactone compounds include butyrolactone, γ-valerolactone, γ-caprolactone, γ-caprylolactone, γ-laurolactone, γ-palmitolactone, γ-stearolactone, crotonolactone, α-angelicalactone, and β-angelicalactone.

Examples of the ε-caprolactone compounds include: ε-caprolactone and monoalkyl-ε-caprolactones such as monomethyl-ε-caprolactone, monoethyl-ε-caprolactone, monodecyl-ε-caprolactone, and monopropyl-ε-caprolactone; dialkyl-ε-caprolactones in which two carbon atoms other than the ε-position carbon atom are each substituted with an alkyl group; trialkyl-ε-caprolactones in which three carbon atoms other than the ε-position carbon atom are each substituted with an alkyl group; alkoxy-ε-caprolactones such as ethoxy-ε-caprolactone; cycloalkyl-ε-lactones such as cyclohexyl-ε-caprolactone; aralkyl-ε-caprolactones such as benzyl-ε-caprolactone; and aryl-ε-caprolactones such as phenyl-ε-caprolactone.

Examples of the δ-valerolactone compounds include 5-valerolactone, 3-methyl-5-valerolactone, 3,3-dimethyl-5-valerolactone, 2-methyl-5-valerolactone, and 3-ethyl-5-valerolactone.

One of these lactone compounds can be used alone, or two or more of these can be used in combination.

Of the compounds shown above, ε-caprolactone compounds or δ-valerolactone compounds are preferred as lactone compounds for use in the invention, from the standpoint of reactivity. Of these, ε-caprolactone compounds are more preferred since these compound are easily available at low cost.
<Process for Producing Modified EVOH Resin (A)>

The ring-opening polymerization reaction and grafting reaction of a lactone compound in the presence of an EVOH resin are usually conducted while keeping the EVOH resin in a molten state. Examples of methods therefor include: a method in which the reactions are conducted in a stirring vessel type production device having stirring blades while heating and stirring the EVOH resin; and a method in which the reactions are conducted using an extruder or the like. However, it is preferred to employ the method in which a stirring vessel type production device is used, because reaction time is easy to control therewith.

The materials may be successively charged into the production device, or may be mixed together beforehand and charged. A most preferred method of these is to first charge the EVOH resin and add thereto a lactone compound containing a catalyst dissolved therein. Preferred as a method for charging the lactone and the catalyst is to charge the solution while stirring the EVOH resin.

The use amount of the lactone compound relative to the EVOH resin may be suitably selected so that a desired content of grafted aliphatic-polyester units is obtained. However, the amount thereof per 100 parts by weight of the EVOH resin is usually 1-200 parts by weight, preferably 10-150 parts by weight, especially preferably 20-100 parts by weight. In case where the lactone compound is used in too small an amount, the flexibility tends to decrease. Meanwhile, in case where the use amount thereof is too large, the gas barrier properties tend to decrease.

As the catalyst, use can be made of a catalyst conventionally known as a ring-opening polymerization catalyst for lactone compounds. Examples thereof include titanium compounds and tin compounds. Specific examples thereof include titanium alkoxides such as tetra-n-butoxytitanium, tetraisobutoxytitanium, and tetraisopropoxytitanium, tin alkoxides such as dibutyldibutoxytin, and tin ester compounds such as dibutyltin diacetate. Of these, tetra-n-butoxytitanium is preferred because this compound is easily available at low cost.

The amount of the catalyst to be used per 100 parts by weight of the lactone compound is usually 0.01-1 part by weight, preferably 0.03-0.5 parts by weight, especially preferably 0.05-0.3 parts by weight. In case where the catalyst is used either in too small or in too large an amount, the degree of modification tends to decrease.

The reaction temperature in the grafting reaction is usually 50-250° C., preferably 100-240° C., more preferably 150-230° C., at which the resin comes into a molten state. In case where the reaction temperature is too high, the modified EVOH resin (A) tends to deteriorate thermally. Meanwhile, in case where the reaction temperature is too low, the grafting reaction with the EVOH resin tends not to proceed and the resin tends to remain unmodified.

The temperature of each material at the time of charging for the grafting reaction is usually room temperature, for example, 10-40° C.

After the lactone compound and the catalyst are added to the EVOH resin, the mixture is heated at a rate of usually 0.1-50° C./min, preferably 0.15-10° C./min, more preferably 0.2-5° C./min. In case where the heating rate is too high, the grafting reaction with the EVOH resin tends not to proceed and the resin tends to remain unmodified. Meanwhile, in case where the heating rate is too low, the modified EVOH resin (A) tends to deteriorate thermally.

The reaction time in the grafting reaction is usually 10 seconds to 24 hours, preferably 1 minute to 15 hours, more preferably 30 minutes to 6 hours. In case where the reaction time is too long, the modified EVOH resin (A) tends to deteriorate thermally. Meanwhile, in case where the reaction time is too short, the grafting reaction with the EVOH resin tends not to proceed and the resin tends to remain unmodified.

As the production device, use can be made, for example, of a vertical stirring production device equipped with stirrers, a horizontal stirring production device having one or two shafts with stirring blades, or an extruder.

Examples of the stirring blades include double-helical ribbon blades, single-helical ribbon blades, screw blades, V-shaped blades, propeller blades, turbine blades, and anchor blades. Of these, double-helical ribbon blades are preferred from the standpoint of stirring efficiency.

The rotational speed of the stirring blade is usually 1-200 rpm, preferably 3-100 rpm, more preferably 5-80 rpm. In case where the rotational speed thereof is either too high or too low, the grafting reaction tends to be uneven.

It is preferable that the grafting reaction should be conducted in a nitrogen stream in order to prevent the EVOH resin from deteriorating.

After the grafting reaction, it is preferred to remove the unreacted monomer in order to avoid odor emission. Examples of methods for removing the unreacted monomer include a method in which the reaction product is immersed in a solution in which the unreacted monomer dissolves and a method in which the unreacted monomer is removed under vacuum. From the standpoint of production efficiency, the method in which the unreacted monomer is removed under vacuum is preferred.

With respect to conditions for the removal under vacuum, it is preferred to conduct the removal, for example, at the same set temperature as the reaction temperature at a pressure of 100-101,200 Pa for 1 second to 10 hours.

Examples of methods for taking the modified EVOH resin (A) out of the production device after the grafting reaction include: a method in which the inside of the production device is pressurized to thereby convey the modified EVOH resin (A); a method in which the modified EVOH resin (A) is conveyed by its own weight; and a method in which a pump is used to convey the modified EVOH resin (A). From the standpoint of production efficiency, the method in which the inside of the production device is pressurized is preferred.

Thus, the modified EVOH resin (A) is obtained. In the modified EVOH resin (A) obtained, the content of the EVOH resin structural units, which constitute the backbone of the modified EVOH resin (A), is usually 40-99% by weight, preferably 45-95% by weight, especially preferably 50-90% by weight. The content of aliphatic-polyester units grafted to the backbone is usually 1-60% by weight, preferably 5-55% by weight, especially preferably 10-50% by weight. In case where the content of the EVOH resin units is too high, the flexibility tends to decrease. Meanwhile, in case where the content of the EVOH resin units is too low, the gas barrier properties tend to decrease.

The content of the EVOH resin units and the content of the grafted aliphatic-polyester units in the modified EVOH resin (A) can be calculated from the results of an examination by $^1$H-NMR spectroscopy.

The degree of modification in the modified EVOH resin (A) obtained is usually 0.1-30% by mole, more preferably 1-20% by mole, especially preferably 5-15% by mole. The term "degree of modification" means the proportion of EVOH resin structural units to which the aliphatic polyester has been grafted in all the EVOH resin structural units. In case where the degree of modification in the modified EVOH resin (A) is too low, the flexibility tends to decrease.

Meanwhile, in case where the degree of modification in the modified EVOH resin (A) is too high, the gas barrier properties tend to decrease.

The degree of modification in the modified EVOH resin (A) can be calculated from the results of an examination by $^1$H-NMR spectroscopy.

With respect to the average chain length of the aliphatic polyester units in the modified EVOH resin (A) obtained, the number of units is usually 1.0-3.0, preferably 1.0-2.5, especially preferably 1.0-2.0. In case where the average chain length of the aliphatic polyester units is too long, the gas barrier properties tend to decrease.

The average chain length of the aliphatic polyester units in the modified EVOH resin (A) can be calculated from the results of an examination by $^1$H-NMR spectroscopy.

The number-average molecular weight (determined by measurement by gel permeation chromatography (OPC) and calculation for standard polystyrene) of the modified EVOH resin (A) obtained is usually 10,000-300,000, preferably 12,500-200,000, especially preferably 15,000-100,000. In case where the number-average molecular weight of the modified EVOH resin (A) is too high, the barrier properties tend to decrease. Meanwhile, in case where the number-average molecular weight of the modified EVOH resin (A) is too low, the flexibility tends to decrease.

The number-average molecular weight of the modified EVOH resin (A) can be calculated from the results of a measurement by GPC.

The melting point of the modified EVOH resin (A) obtained is usually 50-190° C., preferably 60-160° C., especially preferably 70-120° C. In case where the melting point of the modified EVOH resin (A) is too high, the flexibility tends to decrease. Meanwhile, in case where the melting point of the modified EVOH resin (A) is too low, the gas barrier properties tend to decrease.

In general, in the skeletal EVOH resin, the intermolecular force due to, for example, hydrogen bonding between the hydroxyl groups is weakened by the grafting of the aliphatic polyester. Because of this, as the degree of modification of the modified EVOH resin increases, the melting point of the modified EVOH resin (A) tends to decrease.

The melting point of the modified EVOH resin (A) can be measured with a differential scanning calorimeter.

Ingredients generally incorporated into EVOH resins may be contained in the modified EVOH resin (A) to be used in the invention, so long as these ingredients do not lessen the effect of the invention (for example, up to 5% by weight based on the resin composition). Examples of such ingredients include heat stabilizers, antioxidants, antistatic agents, colorants, ultraviolet absorbers, lubricants, plasticizers, light stabilizers, surfactants, antibacterials, drying agents, antiblocking agents, flame retardants, crosslinking agents, hardeners, blowing agents, nucleators, antifogging agents, additives for biodegradation, silane coupling agents, and oxygen absorbers.

Examples of the heat stabilizers include the following additives used for the purpose of improving various properties including thermal stability during melt molding: organic acids such as acetic acid, propionic acid, butyric acid, lauric acid, stearic acid, oleic acid, and behenic acid and salts thereof such as alkali metal salts (sodium, potassium, etc.), alkaline earth metal salts (calcium, magnesium, etc.), and the zinc salts; and inorganic acids such as sulfuric acid, sulfurous acid, carbonic acid, phosphoric acid, and boric acid and salts thereof such as alkali metal salts (sodium, potassium, etc.), alkaline earth metal salts (calcium, magnesium, etc.), and the zinc salts.

One of these additives may be used alone, or two or more thereof may be used as a mixture thereof.

It is especially preferable that the modified EVOH resin (A) should contain any of acetic acid, boron compounds including boric acid and salts thereof, acetic acid salts, and phosphoric acid salts, among those additives.

In the case where acetic acid is contained, the content thereof, per 100 parts by weight of the modified EVOH resin (A), is usually 0.001-1 part by weight, preferably 0.005-0.2 parts by weight, especially preferably 0.01-0.1 part by weight. In case where the content of acetic acid is too low, the effect of the inclusion of acetic acid tends not to be obtained sufficiently. Conversely, in case where the content thereof is too high, an even film tends to be difficult to obtain.

In the case where a boron compound is contained, the content thereof in terms of boron amount (determined after ashing by analysis by ICP emission spectroscopy) per 100 parts by weight of the modified EVOH resin (A), is usually 0.001-1 part by weight, preferably 0.002-0.2 parts by weight, especially preferably 0.005-0.1 part by weight. In case where the content of a boron compound is too low, the effect of the inclusion of the boron compound may not be obtained sufficiently. Conversely, in case where the content thereof is too high, an even film tends to be difficult to obtain.

The content of an acetic acid salt or a phosphoric acid salt (including any of hydrogen phosphate salts), in terms of metal amount (determined after ashing by analysis by ICP emission spectroscopy) per 100 parts by weight of the modified EVOH resin (A), is usually 0.0005-0.1 part by weight, preferably 0.001-0.05 parts by weight, especially preferably 0.002-0.03 parts by weight. In case where the content thereof is too low, the effect of the inclusion thereof may not be obtained sufficiently. Conversely, in case where the content thereof is too high, an even film tends to be difficult to obtain. In the case where two or more salts are incorporated into the modified EVOH resin (A), it is preferable that the total amount of the salts should be in the content range shown above.

In the case where an alkali metal salt is used as the salt, the content of the alkali metal salt is usually 10-2,000 ppm by weight, preferably 25-1,000 ppm by weight, especially preferably 50-500 ppm by weight, of the modified EVOH resin (A). In case where an alkali metal salt is incorporated in too large an amount, a coloring failure tends to result. Conversely, in case where the amount of the alkali metal salt incorporated is too small, interlaminar adhesiveness tends to decrease.

Methods for incorporating any of acetic acid, boron compounds, acetic acid salts, and phosphoric acid salts into the modified EVOH resin (A) are not particularly limited. Examples thereof include: a method in which an EVOH resin obtained by any of the following methods i) to iv) is subjected to a grafting reaction with a lactone compound; and a method in which a modified EVOH resin is treated by the following method v) or vi).

Examples of methods for incorporating additives such as acetic acid, boron compounds, acetic acid salts, and phosphoric acid salts into an EVOH resin include i) a method in which a porous EVOH resin precipitate having a water content of 20-80% by weight is brought into contact with an aqueous solution of the additives to incorporate the additives into the porous EVOH resin and this resin is then dried, ii) a method in which the additives are incorporated into an even solution (e.g., water/alcohol solution) of an EVOH resin, and this mixture is extruded in the shape of strands into a coagulating liquid, and the strands obtained are cut into pellets and dried; iii) a method in which an EVOH resin and the additives are mixed together en bloc and the resultant mixture is melt-kneaded with an extruder or the like; and iv) a method in which the alkali (sodium hydroxide, potassium hydroxide, etc.) used in the saponification step during the production of an EVOH resin is neutralized with an organic acid such as acetic acid and the amounts of the remaining organic acid such as acetic acid and the salt yielded as a by-product are regulated by washing with water.

Preferred from the standpoint of further enhancing the effect of the present invention are the methods i) and ii), which are excellent in terms of the dispersibility of the additives, and the method iv), which is suitable for the case of incorporating an organic acid and a salt thereof.

Examples of other methods for adding additives such as acetic acid, boron compounds, acetic acid salts, and phosphoric acid salts to a modified EVOH resin include: v) a method in which a modified EVOH resin is brought into contact with an aqueous solution of the additives to incorporate the additives into the modified EVOH resin and this resin is then dried; and vi) a method in which a modified EVOH resin and the additives are mixed together en bloc and the resultant mixture is melt-kneaded with an extruder or the like.

It is also possible to blend two or more different modified EVOH resins (A) or to blend a modified EVOH resin (A) with an ordinary EVOH resin.

In the present invention, the content of the modified EVOH resin (A) in the modified EVOH resin composition of the invention is preferably 70% by weight or higher, more preferably 80% by weight or higher, especially preferably 90% by weight of higher. In cases when the modified EVOH resin (A) is contained in the resin composition in an amount within that range, this resin composition not only is flexible and has gas barrier properties but also can be easily extrusion-molded in melt extrusion molding.

<Alkali Metal (B)>

The alkali metal (B) to be used in the invention is explained next.

The term "alkali metal (B)" means lithium, sodium, potassium, rubidium, cesium, etc. One of these can be used alone, or two or more thereof can be used as a mixture thereof. From the standpoints of interlaminar adhesiveness and suitability for long run, sodium and potassium are preferred of these, and sodium is especially preferred.

Usually, the alkali metal (B) is contained as low-molecular-weight compound (specifically, salt, hydroxide, etc.). From the standpoint of dispersibility in the modified EVOH resin (A), it is preferable that the alkali metal (B) should be contained as salt.

In the case of salt, the salt may be inorganic salt such as carbonate, hydrogen carbonate, phosphate, borate, sulfate, and chloride, or may be organic acid salt such as salt with monocarboxylic acid having 2-11 carbon atoms (e.g., acetate, butyrate, propionate, enanthate, and caprate), salt with dicarboxylic acid having 2-11 carbon atoms (e.g., oxalate, malonate, succinate, adipate, suberate, and sebacate), and salt with monocarboxylic acid having 12 or more carbon atoms (e.g., laurate, palmitate, stearate, 12-hydroxystearate, behenate, and montanate). A mixture of two or more of these is also possible.

The alkali metal (B) is preferably organic acid salt, more preferably monocarboxylic acid salt which have 2-4 carbon atoms and is water-soluble low-molecular-weight compound, especially preferably the acetate and the propionate, most preferably the acetate.

The content of the alkali metal (B) is usually 10-2,000 ppm by weight, preferably 25-1,000 ppm by weight, especially preferably 50-500 ppm by weight, of the modified EVOH resin (A). In case where the content of the alkali metal (B) is too high, a coloring failure tends to occur. Meanwhile, in case where the content of the alkali metal (B) is too low, interlaminar adhesiveness tends to decrease.

The content (ppm) of the alkali metal (B) can be determined by ashing dry-state pellets of the modified EVOH resin composition, dissolving the ash in an aqueous hydrochloric acid solution, examining the resultant solution by atomic absorption analysis, and calculating the content of alkali metal (B) from absorbance ratio between the solution and a reference solution.

<Alkaline Earth Metal (C)>

The alkaline earth metal (C) to be used in the invention is explained next.

The term "alkaline earth metal (C)" means beryllium, magnesium, calcium, strontium, barium, radium, etc. One of these can be used alone, or two or more thereof can be used as a mixture thereof. From the standpoints of interlaminar adhesiveness and suitability for long run, magnesium and calcium are preferred of these, and magnesium is especially preferred.

Usually, the alkaline earth metal (C) is contained as low-molecular-weight compound (specifically, salt, hydroxide, etc.). From the standpoint of dispersibility in the modified EVOH resin (A), it is preferable that the alkaline earth metal (C) should be contained as salt.

In the case of salt, the salt may be inorganic salt such as carbonate, hydrogen carbonate, phosphate, borate, sulfate, and chloride, or may be organic acid salt such as salt with monocarboxylic acid having 2-11 carbon atoms (e.g., acetate, butyrate, propionate, enanthate, and caprate), salt with dicarboxylic acid having 2-11 carbon atoms (e.g., oxalate, malonate, succinate, adipate, suberate, and sebacate), and salt with monocarboxylic acid having 12 or more carbon atoms (e.g., laurate, palmitate, stearate, 12-hydroxystearate, behenate, and montanate). A mixture of two or more of these is also possible.

The alkaline earth metal (C) is preferably organic acid salt, more preferably monocarboxylic acid salt which have 2-4 carbon atoms and is water-soluble low-molecular-weight compound, especially preferably the acetate and the propionate, most preferably the acetate.

The content of the alkaline earth metal (C) is usually 30-2,000 ppm by weight, preferably 200-1,500 ppm by weight, more preferably 500-1,200 ppm by weight, especially preferably 600-1,200 ppm by weight, of the modified EVOH resin (A). In case where the content of the alkaline earth metal (C) is too high, the moldability tends to decrease. Meanwhile, in case where the content of the alkaline earth metal (C) is too low, the moldability tends to decrease.

The content (ppm) of the alkaline earth metal (C) can be determined by ashing dry-state pellets of the modified EVOH resin composition, dissolving the ash in an aqueous hydrochloric acid solution, examining the resultant solution by atomic absorption analysis, and calculating the content of alkaline earth metal (C) from absorbance ratio between the solution and a reference solution.

<Resin Composition>

The modified EVOH resin composition of the invention (hereinafter also referred to simply as "resin composition") is a composition including the modified EVOH resin (A) described above and at least one metal selected from the group consisting of alkali metal (B) and alkaline earth metal (C).

Examples of methods for producing the resin composition include: I) a method in which alkali metal and/or alkaline earth metal is incorporated into the modified EVOH resin; and II) a method in which an EVOH resin and a lactone compound are subjected to a grafting reaction in the presence of alkali metal and/or alkaline earth metal, and the alkali metal and/or alkaline earth metal is used.

Of these, the method II) in which an EVOH resin and a lactone compound are reacted in the presence of alkali metal is preferred from the standpoints of even incorporation and case of modification. From the standpoint of ease of preparation, the method I) in which at least one alkaline earth metal is incorporated into the modified EVOH resin is preferred.

<Methods for Preparing the Resin Composition>

Examples of the method I) in which alkali metal and/or alkaline earth metal is incorporated into the modified EVOH resin include: a method in which the modified EVOH resin is brought into contact with an aqueous solution of the alkali metal and/or alkaline earth metal to incorporate the alkali metal and/or alkaline earth metal into the modified EVOH resin and this resin is then dried; a method in which the modified EVOH resin and the alkali metal and/or alkaline earth metal are mixed together en bloc and the mixture is melt-kneaded with an extruder or the like; and a method in which the alkaline earth metal is dry-blended with the modified EVOH resin.

Meanwhile, with respect to the derivation of the alkali metal and/or alkaline earth metal in the method II) in which an EVOH resin and a lactone compound are subjected to a grafting reaction in the presence of alkali metal and/or alkaline earth metal and the alkali metal and/or alkaline earth metal is used, examples include: a method in which an EVOH resin containing the alkali metal and/or alkaline earth metal is used; and a method in which an EVOH resin not containing the alkali metal and/or alkaline earth metal is mixed en bloc with a lactone compound and with the alkali metal and/or alkaline earth metal and this mixture is subjected to a grafting reaction.

Methods for obtaining the EVOH resin containing alkali metal and/or alkaline earth metal are not particularly limited.

EVOH resins are generally produced using the hydroxide of an alkali metal, such as sodium hydroxide or potassium hydroxide, and/or the hydroxide of an alkaline earth metal, such as magnesium hydroxide or calcium hydroxide, as a saponification catalyst. The alkali metal and/or alkaline earth metal in such a catalyst is inevitably present in the EVOH resin as the sodium acetate or magnesium acetate which was yielded as a by-product of the saponification, and also as a component of a salt with the carboxyl groups which were formed in a slight amount at EVOH polymer chain terminals.

Under such circumstances, the content of the alkali metal and/or alkaline earth metal present in such an EVOH resin in an unwashed state is about 3,000 ppm of the EVOH resin.

In the case where an EVOH resin in which the alkali metal and/or alkaline earth metal remains in an amount larger than the given amounts is made to have a content of the alkali metal and/or alkaline earth metal within the range shown above, this EVOH resin is washed more sufficiently than in ordinary production to thereby regulate the content of the alkali metal and/or alkaline earth metal to the specific slight amount shown above.

Specifically, it is difficult to remove the alkali metal and/or alkaline earth metal to the specific slight amount by merely performing washing with water.

Consequently, in the case of using an EVOH resin produced through saponification, it is preferable that the EVOH resin should be washed with an acid such as acetic acid and then washed with water and the thus-washed EVOH resin be used. In particular, the alkali metal and/or alkaline earth metal bonded to the carboxyl groups present at polymer chain terminals can be efficiently removed by washing with an acid.

Examples of the acid to be used in the washing liquid include water-soluble weak acids such as acetic acid, propionic acid, and butyric acid. Of these, acetic acid is preferred.

The water to be used in the washing liquid preferably is water from which metal ions as impurities have been removed, such as ion-exchanged water, distilled water, or filtered water.

However, an alkali metal and/or an alkaline earth metal may be separately added, for example, in the case where the washing accuracy has improved, or where use is made of an EVOH resin containing substantially no alkali metal and/or alkaline earth metal, such as an EVOH resin produced through saponification performed in the presence of an acid catalyst, or where the content of the alkali metal and/or alkaline earth metal is desired to be regulated after washing.

When adding an alkali metal ingredient and/or an alkaline earth metal ingredient to an EVOH resin, a suitable method therefor, from the standpoint of production, is to bring the EVOH into contact with an aqueous solution of the alkali metal ingredient and/or alkaline earth metal ingredient. The concentration of the alkali metal ingredient and/or alkaline earth metal ingredient in this aqueous solution is preferably 0.001-1% by weight (more preferably 0.005-0.8% by weight, especially preferably 0.01-0.5% by weight) in terms of total metal amount. In case where the concentration of the alkali metal ingredient and/or alkaline earth metal ingredient is too low, it is difficult to incorporate the alkali metal ingredient and/or alkaline earth metal ingredient in the given amount. Conversely, in case where the concentration of the alkali metal ingredient and/or alkaline earth metal ingredient is too high, the molded object to be finally obtained may have reduced appearance properties. Too low and too high concentrations thereof are hence undesirable.

Methods for bringing an EVOH resin into contact with the aqueous solution are not particularly limited. However, it is usually preferable that the EVOH resin in the form of pellets should be added to the aqueous solution and this mixture be continuously stirred to thereby incorporate the alkali metal ingredient and/or alkaline earth metal ingredient into the EVOH resin.

For preparing (molding) the EVOH resin pellets, a known method can be employed. For example, use may be made of a method in which a solution of the EVOH resin in a water/alcohol mixture or the like is extruded in the shape of strands or a sheet into a coagulating liquid and the strands or sheet obtained is cut into pellets.

The shape of the pellet-form EVOH resin preferably is cylindrical, spherical, etc. In the case of cylindrical pellets, the diameter thereof is preferably 1-10 mm and the length thereof is preferably 1-10 mm. In the case of spherical pellets, the diameter thereof is preferably 1-10 mm.

It is preferable that this EVOH resin should be one having a microporous internal structure in which pores having a diameter of about 0.1-10 μm have been evenly distributed, from the standpoint that the alkali metal ingredient and/or alkaline earth metal ingredient can be evenly incorporated thereinto. Usually, an EVOH resin having this structure can be obtained by extruding a solution of an EVOH resin (in a water/alcohol mixed solvent, etc.) into a coagulating bath while regulating, at will, the concentration of the EVOH resin solution (20-80% by weight), extrusion temperature (45-70° C.), kind of the solvent (water/alcohol mixed ratio by weight=80/20 to 5/95, etc.), temperature of the coagulating bath (1-20° C.), residence time (0.25-30 hours), amount of the EVOH resin in the coagulating bath (0.02-2% by weight), etc.

Furthermore, an EVOH resin having a water content of 20-80% by weight is preferred because the compounds shown above, etc. can be evenly and rapidly incorporated thereinto. Although regulation of the content of the alkali metal ingredient and/or alkaline earth metal ingredient is not particularly limited, the content thereof can be regulated in the contact treatment with the aqueous solution by controlling the concentration of the alkali metal ingredient and/or alkaline earth metal ingredient in the aqueous solution thereof, period of the contact treatment, temperature for the contact treatment, stirring speed during the contact treatment, water content of the EVOH resin to be treated, etc.

Thus, a pellet-form hydrous EVOH resin composition containing the alkali metal ingredient and/or alkaline earth metal ingredient is obtained. Usually, drying is performed after the contact treatment.

For the drying, various drying methods can be employed. Examples thereof include: fluidized drying in which the EVOH resin composition in substantially a pellet form or the like is dried while being stirred and dispersed mechanically or by hot-air blowing; and stationary drying in which the EVOH resin composition in substantially a pellet form or the like is dried without undergoing any dynamic action such as stirring or dispersing. Examples of dryers for performing the fluidized drying include a cylindrical trough stirring dryer, tubular dryer, rotary dryer, fluidized-bed dryer, vibrating fluidized-bed dryer, and conical rotary dryer. Examples of dryers for performing the stationary drying include a batch tray dryer, as a dryer of the type in which the material is allowed to stand still, and a band dryer, tunnel dryer, and vertical dryer, as dryers of the material transfer type. However, usable dryers are not limited to these examples. It is also possible to conduct fluidized drying and stationary drying in combination.

As a heating gas for the drying, it is preferred to use air or an inert gas (nitrogen gas, helium gas, argon gas, etc.). The temperature of the heating gas is preferably 40-150° C., from the standpoints of production efficiency and prevention of the thermal deterioration of the EVOH resin composition. The time period of the drying depends on the water content of the EVOH resin composition and the amount of the EVOH resin composition to be dried, but is usually preferably about 15 minutes to 72 hours from the standpoints of production efficiency and prevention of the thermal deterioration of the EVOH resin composition.

The EVOH resin composition is dried under these conditions to obtain a resin composition configured of the EVOH resin and the alkali metal ingredient and/or alkaline earth metal ingredient. It is preferable that the drying should be conducted so that the resin composition obtained through the drying has a water content of 0.001-5% by weight (more preferably 0.01-2% by weight, especially preferably 0.1-1% by weight). In case where the water content thereof is too low, the resin composition to be finally obtained tends to have reduced long-run moldability. Conversely, in case where the water content thereof is too high, foaming is prone to occur during melt kneading for molding. Such too low or too high water contents are hence undesirable.

<Applications of the Resin Composition>

The thus-obtained modified EVOH resin composition of the invention, which contains at least one metal selected from the group consisting of alkali metal and alkaline earth metal, can be molded by melt molding into, for example, films, sheets, cups, bottles, etc. Mainly used as methods for the melt molding are extrusion molding methods (T-die extrusion, inflation extrusion, blow molding, melt spinning, profile extrusion, etc.) and injection molding methods. Usually, a melt molding temperature is frequently selected from the range of 150-300° C.

Although such molded objects may be used as such in various applications, the molded objects are usually laminated with other base materials in order to further enhance the strength or impart other functions, thereby obtaining laminates.

Thermoplastic resins are useful as such other base materials. Examples of the thermoplastic resins include polyolefins such as polyethylenes, e.g., linear low-density polyethylene, low-density polyethylene, ultralow-density polyethylene, medium-density polyethylene, and high-density polyethylene, polypropylene, ethylene-propylene (block and random) copolymers, propylene-α-olefin (α-olefin having 4-20 carbon atoms) copolymers, polybutene, and polypentene, graft polyolefins obtained by graft-modifying polyolefins with an unsaturated carboxylic acid or an ester thereof, ionomers, ethylene-vinyl acetate copolymers, ethylene-acrylic acid copolymers, ethylene-acrylic ester copolymers, polyester resins, polyamide resins (including copolyamides), poly(vinyl chloride), poly(vinylidene chloride), acrylic resins, polystyrene, vinyl ester resins, polyester elastomers, polyurethane elastomers, halogenated polyolefins such as chlorinated polyethylene and chlorinated polypropylene, aromatic or aliphatic polyketones, and polyalcohols obtained by reducing these polymers. Preferred from the standpoint of suitability for practical use, such as the properties (in particular, strength) of the laminates, are polyolefin resins and polyamide resins. It is especially preferred to use polyethylenes and polypropylene.

These base resins may contain conventionally known ingredients such as antioxidants, antistatic agents, lubricants, nucleators, antiblocking agents, ultraviolet absorbers, and waxes, so long as the inclusion thereof is not counter to the spirit of the invention.

When laminating the resin composition of the invention with other base materials, the laminating can be conducted by a known method. Examples of laminating methods include: a method in which another base material is laminated to a film, sheet, or the like of the resin composition of the invention by melt extrusion laminating; a method in which, conversely, the resin is laminated to another base material by melt extrusion laminating; a method in which the resin and another base material are co-extruded; a method in which the resin (layer) and another base material (layer) are dry-laminated to each other using a known adhesive such as an organotitanium compound, isocyanate compound, polyester compound, or polyurethane compound; and a method in which a solution of the resin is applied to another base material and the solvent is then removed.

Of these, the method in which the materials are co-extruded is preferred from the standpoints of cost and environment.

Layer configurations of such laminate may be as follows. In cases when a layer including the resin composition of the invention is expressed by a (a1, a2, . . . ) and a layer including a thermoplastic resin is expressed by b (b1, b2, . . . ), possible configurations include not only the two-layer structure of a/b, but also any desired combinations such as, for example, b/a/b, a/b/a, a1/a2/b, a/b1/b2, b2/b1/a/b1/b2, and b2/b1/a/b1/a/b1/b2. Furthermore, in cases when a recycle layer including a mixture of the EVOH resin composition and a thermoplastic resin and obtained by re-melting and re-molding, for example, the trimmings and defectives generated during the production of the laminate is expressed by R, possible configurations include b/R/a, b/R/a/b, b/R/a/R/b, b/a/R/a/b, and b/R/a/R/a/R/b.

In the layer configurations shown above, a layer of an adhesive resin can be disposed between the layers according to need. As the adhesive resin, a known one may be used. Such adhesive resins vary depending on the kind of the resin b, and an appropriate one may hence be suitably selected. However, representative examples thereof include a carboxyl-containing modified olefin polymer obtained by chemically bonding an unsaturated carboxylic acid or the anhydride thereof to a polyolefin resin by addition reaction, grafting reaction, etc. Examples thereof include polyethylene graft-modified with maleic anhydride, polypropylene graft-modified with maleic anhydride, ethylene-propylene (block and random) copolymers graft-modified with maleic anhydride, ethylene-ethyl acrylate copolymers graft-modified with maleic anhydride, and ethylene-vinyl acetate copolymers graft-modified with maleic anhydride. One polymer selected from among these or a mixture of two or more thereof is preferred. These adhesive resins can be blended with the EVOH composition, another EVOH, or a rubber or elastomer ingredient such as polyisobutylene or an ethylene-propylene rubber, or with the resin of layer b. In particular, blending with a polyolefin resin different from the polyolefin resin used as the base of the adhesive resin is useful because this blending may improve the adhesiveness.

The laminate described above is subjected to a (hot) stretching treatment according to need. The term "(hot) stretching treatment" means an operation in which a laminate in the form of a film or sheet that has been evenly heated thermally is evenly formed into the shape of a tube or film by means of chucks, a plug, vacuum, air pressure, blowing, etc. The stretching may be either uniaxial stretching or biaxial stretching. In the case of biaxial stretching, the stretching may be either simultaneous stretching or sequential stretching.

As a stretching method, use can be made of one which is high in stretch ratio and is selected from among a roll stretching method, tenter stretching method, tubular stretching method, stretch blowing method, vacuum/air-pressure forming, and the like. In the case of biaxial stretching, either a simultaneous biaxial stretching mode or a sequential biaxial stretching mode can be employed. The stretching temperature is selected from the range of usually about 40-170° C., preferably about 60-160° C. In case where the stretching temperature is too low, the stretchability is poor. In case where the stretching temperature is too high, it is difficult to maintain a stable stretched state.

After the stretching, thermal fixing may be successively performed for the purpose of imparting dimensional stability. The thermal fixing can be conducted by a known means. For example, the stretched film is heat-treated at usually 80-180° C., preferably 100-165° C., usually for about 2-600 seconds while keeping the film in the stretched state.

In the case where the multilayered stretched film obtained from the resin composition of the invention is to be used as a shrink film, the thermal fixing is omitted and the stretched film is subjected, for example, to a treatment in which cold air is blown against the stretched film to perform cold fixing, in order to impart thermal shrinkability thereto.

The thicknesses of the thermoplastic resin layer(s) and adhesive resin layer(s) of the laminate vary depending on the layer configuration, kind of the thermoplastic resin, kind of the adhesive resin, uses, package form, required properties, etc., and cannot be unconditionally specified. However, the thickness of each thermoplastic resin layer is selected from the range of usually about 10-1,000 μm, preferably about 50-500 μm, and the thickness of each adhesive resin layer is selected from the range of usually about 5-500 μm, preferably about 10-250 μm.

The thickness of the layer(s) including the resin composition of the invention varies depending on the required gas barrier properties, etc. However, the thickness thereof is usually 5-500 μm, preferably 10-250 μm, especially preferably 20-100 μm. In case where the thickness thereof is too small, sufficient gas barrier properties tend not to be obtained. Conversely, in case where the thickness thereof is too large, the film tends to have reduced flexibility.

The laminate obtained can be further coated with another base material by extrusion coating, or a film, sheet, or the like of another base material can be laminated to the obtained laminate using an adhesive. In this case, the base material to be used can be any desired base material (e.g., paper, a metal foil, a uni- or biaxially stretched plastic film or sheet, the plastic film or sheet coated with an inorganic compound by vapor deposition, woven fabric, nonwoven fabric, metal felt, or wood) besides the thermoplastic resins enumerated above.

Containers and covers including bags, cups, trays, tubes, bottles, etc. which are constituted of the thus-obtained film, sheet, or stretched film are useful as various kinds of packaging materials or containers not only for general foods but also for seasonings such as mayonnaise and dressing, fermented foods such as miso, fat or oil foods such as salad oil, beverages, cosmetics, medicines, etc.

EXAMPLES

The present invention is explained below in more detail by reference to Examples, but the invention should not be construed as being limited to the following Examples unless the invention departs from the spirit thereof.

In the following Examples, Comparative Example, and Reference Examples, "parts" and "%" are by weight.

Test Example 1

Example 1

[Production of Alkali-Metal-Containing EVOH Resin Composition]

A solution (60° C.; EVOH concentration, 46%) of an EVOH resin [ethylene content, 44% by mole; degree of saponification, 99.7% by mole; MFR, 12 g/10 min (210° C.; load, 2,160 g); melting point, 164° C.] in a water/methanol mixture (water/methanol mixing ratio=20/80 by weight) was extruded in the form of strands into a water bath kept at 6° C. to coagulate the solution. Thereafter, the strands were cut with a cutter to obtain an EVOH resin (I) in the form of porous pellets (diameter, 4 mm; length, 4 mm).

Subsequently, the thus-obtained EVOH resin (I) in the form of porous pellets was washed with water and then added to an aqueous solution containing both acetic acid and 0.1% by weight sodium acetate. This mixture was stirred at 30° C. for about 4 hours. Furthermore, the pellets were dried with a batch tower type fluidized-bed dryer at 75° C. for 3 hours and with a batch ventilated tray dryer at 125° C. for 18 hours. Thus, an alkali-metal-containing EVOH resin composition (II) (pellet form) which contained sodium acetate in an amount of 150 ppm in terms of sodium amount was obtained.

[Production of Modified EVOH Resin Composition]

Into a vertical stirring vessel type production device were introduced 100 parts of the obtained alkali-metal-containing EVOH resin composition (II) (ethylene content, 44% by mole; degree of saponification of the vinyl acetate moieties, 99.7% by mole; sodium content, 150 ppm of the EVOH resin), 30 parts of ε-caprolactone, and 0.03 parts of tetra-n-butoxytitanium. While stirring the mixture at a rotational speed of 10 rpm in a nitrogen stream, the mixture was heated from 25° C. to 200° C. at a heating rate 1.5° C./min and caused to undergo a grafting reaction at that temperature for 3 hours. Thus, an alkali-metal-containing composition (III) of a modified EVOH resin having an aliphatic polyester grafted thereto was obtained (EVOH resin/ε-caprolactone=77/23 by weight; sodium content, 116 ppm of the modified EVOH resin; degree of modification, 7.1% by mole; average chain length of unit, 1.3; melting point, 98° C.).

[Evaluation of Moldability]

Fifty-five grams of the modified EVOH resin composition (III) obtained was introduced into a torque detection type rheometer ("Plastograph", manufactured by Brabender GmbH & Co.) having a temperature set at 230° C. The resin composition was preheated for 5 minutes and then melt-kneaded at a rotational speed of 50 rpm to measure the torque value (Nm) during this melt kneading. The torque value measured at 3 minutes after initiation of the melt kneading was compared. The smaller the torque value, the better the moldability; and the larger the torque value, the poorer the moldability. The results thereof are shown in Table 1.

Comparative Example 1

A modified EVOH resin was produced in the same manner as in Example 1, except that the EVOH resin containing no alkali metal was used in place of the alkali-metal-containing EVOH resin composition (II). Namely, the EVOH resin (I) was used, and an aliphatic polyester was grafted thereto to produce a modified EVOH resin.

The modified EVOH resin obtained was evaluated in the same manner as in Example 1.

Reference Example 1

The alkali-metal-containing EVOH resin composition (II) produced in Example 1 was evaluated in the same manner as in Example 1.

Reference Example 2

The EVOH resin (I) produced in Example 1 was evaluated in the same manner as in Example 1.

The results of the moldability evaluation are shown in Table 1.

TABLE 1

|  | EVOH resin | Na content | Moldability evaluation Torque value after 3 min (Nm) |
|---|---|---|---|
| Example 1 | modified EVOH resin | 116 ppm | 5 |
| Comparative Example 1 | modified EVOH resin | 0 | 50 |
| Reference Example 1 | EVOH resin | 150 ppm | 3 |
| Reference Example 2 | EVOH resin | 0 | 5 |

As can be seen from the results given in Table 1, the alkali-metal-containing modified EVOH resin composition of Example 1 had a smaller torque value at 3 minutes after initiation of the melt kneading than the modified EVOH resin of Comparative Example 1, and was hence found to shown excellent moldability. Meanwhile, the unmodified EVOH resin of Reference Example 2 had a small torque value at 3 minutes after initiation of the melt kneading and showed satisfactory moldability, while the alkali-metal-containing EVOH resin composition of Reference Example 1, which had been obtained by incorporating an alkali metal into an EVOH resin composition, showed slightly changed, but substantially the same, moldability. That is, EVOH resins show satisfactory moldability regardless of the presence or absence of an alkali metal, whereas in the modified EVOH resin, the moldability was greatly improved depending on the presence or absence of an alkali metal.

Test Example 2

Example 2

[Production of Alkali-Metal-Containing EVOH Resin Composition]

A solution (60° C.; EVOH concentration, 46%) of an EVOH resin [ethylene content, 32% by mole; degree of saponification, 99.6% by mole; MFR, 12 g/10 min (210° C.; load, 2,160 g); melting point, 183° C.] in a water/methanol mixture (water/methanol mixing ratio=20/80 by weight) was extruded in the form of strands into a water bath kept at 6° C. to coagulate the solution. Thereafter, the strands were cut with a cutter to obtain an EVOH resin (1) in the form of porous pellets (diameter, 4 mm; length, 4 mm).

Subsequently, the thus-obtained EVOH resin (I) in the form of porous pellets was washed with water and then added to an aqueous solution containing both acetic acid and 0.3% by weight sodium acetate. This mixture was stirred at 30° C. for about 1 hour. Furthermore, the pellets were dried with a batch tower type fluidized-bed dryer at 75° C. for 3 hours and with a batch ventilated tray dryer at 120° C. for 24 hours. Thus, an alkali-metal-containing EVOH resin composition (II) (pellet form) which contained sodium acetate in an amount of 150 ppm in terms of sodium amount was obtained.

[Production of Alkali-Metal-Containing Modified EVOH Resin]

Into a vertical stirring vessel type production device were introduced 100 parts of the alkali-metal-containing EVOH resin composition (II) (ethylene content, 32% by mole; degree of saponification of the vinyl acetate moieties, 99.6% by mole; sodium content in terms of sodium, 150 ppm of the EVOH resin), 30 parts of ε-caprolactone, and 0.03 parts of tetra-n-butoxytitanium. While stirring the mixture at a rotational speed of 30 rpm in a nitrogen stream, the mixture was heated from 25° C. to 200° C. at a heating rate 1.5° C./min and caused to undergo a grafting reaction at that temperature for 3 hours. Thus, an alkali-metal-containing composition (III) of a modified EVOH resin having an aliphatic polyester grafted thereto was obtained (EVOH resin/ε-caprolactone=77/23 by weight; sodium content, 116 ppm of the modified EVOH resin; degree of modification, 7.2% by mole; average chain length of unit, 1.3; melting point, 108° C.).

[Production of Modified EVOH Resin Composition Containing Alkali Metal and Alkaline Earth Metal]

Magnesium acetate as a compound containing an alkaline earth metal was dry-blended with the alkali-metal-containing modified EVOH resin composition (III) obtained above, thereby obtaining pellets of a modified EVOH resin composition (IV) containing an alkali metal and an alkaline earth metal. The magnesium content thereof in terms of magnesium was 560 ppm of the modified EVOH resin.

[Evaluation of Moldability]

Fifty-five grams of the modified EVOH resin composition (IV) obtained, which contained an alkali metal and an alkaline earth metal, was introduced into a torque detection type rheometer ("Plastograph", manufactured by Brabender GmbH & Co.) having a temperature set at 230° C. The resin composition was preheated for 5 minutes and then melt-kneaded at a rotational speed of 50 rpm to measure the torque value (Nm) during this melt kneading. The torque was measured at 5 minutes and at 120 minutes after initiation of the melt kneading. The ratio of the viscosity as measured at 120 minutes after initiation of the melt kneading to the viscosity as measured at 5 minutes after the initiation (120 minutes/5 minutes) was calculated. In cases when the degree of viscosity change calculated with the expression is less than 2.0, desirably less than 1.5, especially less than 1.0, this means that the viscosity increase is slight and the resin composition shows excellent moldability. In cases when the degree of viscosity change is larger than 2.0, this means that the viscosity increase is large and the resin composition has poor moldability. The results thereof are shown in Table 2.

Example 3

In Example 2, magnesium acetate was incorporated into the alkali-metal-containing modified EVOH resin composition (III) in an amount of 1,130 ppm, in terms of magnesium, of the resin composition (III). Thus, a modified EVOH resin composition (IV) containing an alkali metal and an alkaline earth metal was produced. This resin composition (IV) was evaluated in the same manner as in Example 2.

Reference Example 3

In Example 2, the alkali-metal-containing EVOH resin composition (II) produced was dry-blended with magnesium acetate without grafting an aliphatic polyester thereto, thereby incorporating an alkaline earth metal thereinto. Thus, an EVOH resin composition containing the alkali metal and an alkaline earth metal was produced. This resin composition was evaluated in the same manner.

The results of the moldability evaluation are shown in Table 2.

TABLE 2

| | EVOH resin | Na content | Mg content | Moldability evaluation Degree of viscosity change [(after 120 min)/(after 5 min)] |
|---|---|---|---|---|
| Example 2 | modified EVOH resin | 116 ppm | 560 ppm | 1.1 |
| Example 3 | modified EVOH resin | 116 ppm | 1130 ppm | 0.6 |
| Reference Example 3 | EVOH resin | 150 ppm | 560 ppm | —(*) |

*Moldability evaluation was impossible because of too high viscosity-reducing effect.

As can be seen from the results given in Table 2, the modified EVOH resin composition of Example 2, which contained an alkali metal and an alkaline earth metal, had a degree of viscosity change less than 2.0, and was hence found to show excellent melt-extrusion moldability. Furthermore, the modified EVOH resin composition of Example 3, which contained an alkali metal and an alkaline earth metal, had a degree of viscosity change less than 1.0, and was hence found to show even better melt-extrusion moldability. Meanwhile, Reference Example 3, which had been produced by incorporating an alkali metal and an alkaline earth metal into an unmodified EVOH resin composition, was unable to be evaluated for moldability because the viscosity-reducing effect was too high.

While the invention has been described in detail and with reference to specific embodiments thereof, it will be apparent to one skilled in the art that various changes and modifications can be made therein without departing from the spirit and scope thereof. The contents of a Japanese patent application filed on Nov. 22, 2013 (Application No. 2013-241473) and a Japanese patent application filed on Sep. 30, 2014 (Application No. 2014-200515) are incorporated herein by reference.

INDUSTRIAL APPLICABILITY

The modified EVOH resin composition of the invention, which contains at least one metal selected from the group consisting of alkali metal and alkaline earth metal, has excellent melt-extrusion moldability and, hence, is industrially extremely useful.

The invention claimed is:

1. A modified ethylene-vinyl ester saponified copolymer resin composition comprising:
   a modified ethylene-vinyl ester saponified copolymer (A) having an aliphatic polyester grafted thereto; and
   an alkali metal (B).

2. The modified ethylene-vinyl ester saponified copolymer resin composition according to claim 1, wherein a content of the alkali metal (B) is 10-2,000 ppm by weight of the modified ethylene-vinyl ester saponified copolymer.

3. The modified ethylene-vinyl ester saponified copolymer resin composition according to claim 1, wherein the metal is contained as a salt.

* * * * *